(12) United States Patent
Kogo

(10) Patent No.: US 7,193,788 B2
(45) Date of Patent: Mar. 20, 2007

(54) ZOOM LENS AND IMAGE PICKUP APPARATUS

(75) Inventor: Shoji Kogo, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/245,665

(22) Filed: Oct. 6, 2005

(65) Prior Publication Data

US 2006/0082899 A1    Apr. 20, 2006

(30) Foreign Application Priority Data

Oct. 15, 2004    (JP)    ............................ 2004-301895

(51) Int. Cl.
*G02B 15/14* (2006.01)
(52) U.S. Cl. ...................... 359/687; 359/684
(58) Field of Classification Search ............ 348/240.3, 348/240.99; 359/684, 686, 687
See application file for complete search history.

(56) References Cited

U.S. PATENT DOCUMENTS 5,966,245 A * 10/1999 Nagaoka ................. 359/676
6,344,932 B1 * 2/2002 Horiuchi ................. 359/687
6,606,194 B2 * 8/2003 Hamano et al. ........... 359/557
7,113,346 B1 * 9/2006 Souma et al. ............. 359/687
2005/0099700 A1 * 5/2005 Ohtake .................... 359/687

* cited by examiner

*Primary Examiner*—David N. Spector
(74) *Attorney, Agent, or Firm*—Cohen Pontani Lieberman & Pavane LLP

(57) ABSTRACT

A zoom lens includes: a first lens group with a positive refractive power; a second lens group with a negative refractive power; a third lens group with a positive refractive power; a fourth lens group with a positive refractive power, which are arranged in this order from an object side of the zoom lens. The first lens group and the third lens group are positioned statically. The second lens group is moved for zooming the zoom lens. The fourth lens group is moved for correcting a focus movement caused by the zooming and is further moved for focusing the zoom lens. The second lens group is provided with: a negative lens in a meniscus shape; a negative lens; a positive lens; and a negative lens, which are arranged in this order from an objective side of the zoom lens.

17 Claims, 8 Drawing Sheets

WIDE-ANGLE END

STANDARD FOCAL LENGTH

TELEPHOTO END

FIG. 3 ( a )
WIDE-ANGLE END
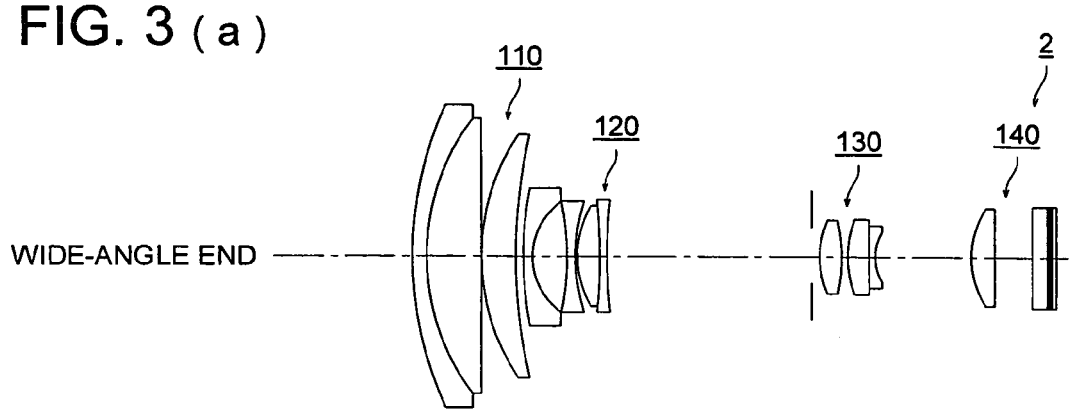
FIG. 3 ( b )
STANDARD FOCAL LENGTH
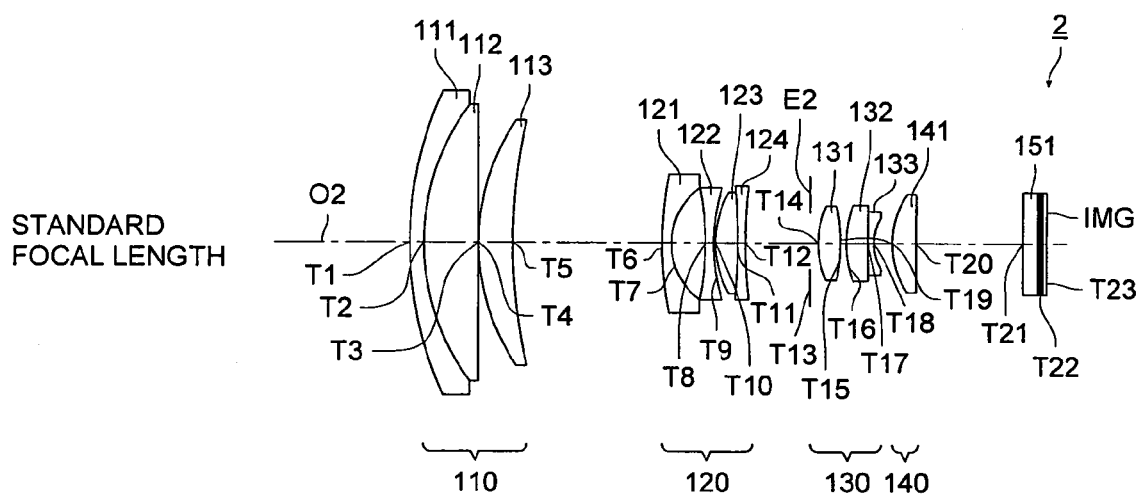
FIG. 3 ( c )
TELEPHOTO END
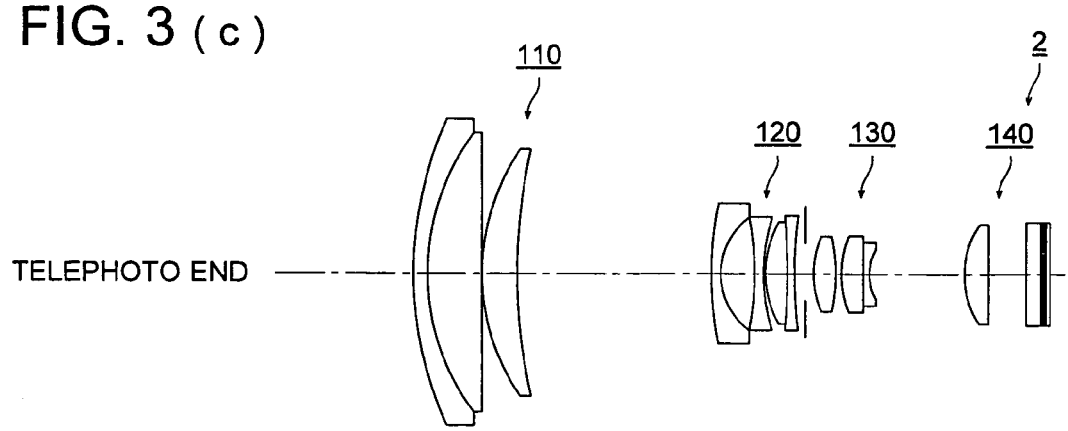

WIDE-ANGLE END

STANDARD FOCAL LENGTH

TELEPHOTO END

ZOOM LENS AND IMAGE PICKUP APPARATUS

This application is based on Japanese Patent Application No. 2004-301895 filed on Oct. 15, 2004 in Japanese Patent Office, which is hereby incorporated by reference.

FIELD OF THE INVENTION

The present invention relates to a zoom lens and an image pickup apparatus.

BACKGROUND OF THE INVENTION

In recent years, along with the smaller sizes of digital still cameras and video cameras, in particular, there has been a strong demand for the realization of zoom lenses having high resolutions and with short overall lens length while having a high zoom ratio.

In order to achieve compact sizes of zoom lenses, it is necessary to make as thin as possible the thicknesses of the groups of lenses included in those zoom lenses, and on the one hand, there is the trend of the refractive power of each group of lens to become strong. A compact zoom lens with a zoom ratio of about 10 has been considered as a small-sized zoom lens (see, for example, Patent Document 1).

Patent Document 1: Japanese Unexamined Patent Application Laid Open No. Hei 9-281393

In case of a compact zoom lens, when the zoom lens is zoomed from the wide-angle end to the telephoto end, the moving stroke of the zooming lens group along the optical axis for zooming becomes short. In order to maintain the zoom ratio with a short moving distance, it is inevitable that the refractive power of the zoom lens group becomes strong, and along with this, even the aberration generated in the zoom lens group increases. In order to maintain a high resolution under such circumstances, it is necessary to reduce power which every lens has, and to reduce the aberration generated in the lens group to a small value by increasing the number of lenses in the zoom lens group and maintaining each lens group thin.

However, in the second group lens which is a zooming lens group and is formed with 3 elements including a negative power lens, a positive power lens, and a negative power lens as a conventional zoom lens disclosed in Patent Document 1, the power which each lens has becomes strong. Therefore, there is a problem that the aberration generated in this lens group becomes large, and it is difficult to maintain a high resolution over the entire range from the wide-angle end to the telephoto end.

SUMMARY OF THE INVENTION

The present invention is made with the above problem in view, and is intended to provide a zoom lens having a high zoom ratio, being compact, being short for the overall length, and having a high resolution over the entire range from the wide-angle end to the telephoto end, and to provide an image pickup apparatus having such a zoom lens.

In order to solve the above problems, the structure described in item 1 includes:

a first lens group having a positive refractive power;
a second lens group having a negative refractive power;
a third lens group having a positive refractive power; and
a fourth lens group having a positive refractive power.

The first to fourth lens groups are arranged in this order from an object side of the zoom lens. The first lens group and the third lens group are positioned statically. The second lens group is moved to be close to an image surface side of the zoom lens for zooming the zoom lens. The fourth lens group is moved for correcting a focus movement caused by zooming the zoom lens and is further moved for focusing the zoom lens. The second lens group is provided with: a negative lens in a meniscus shape whose concave surface faces the image surface side of the zoom lens; a negative lens; a positive lens; and a negative lens, and the negative lens in a meniscus shape, the negative lens, the positive lens, and the negative lens in the second lens group are arranged in this order from an objective side of the zoom lens.

The structure described in item 2, according to the zoom lens of item 1, satisfies the following equations:

$$0.23 \leq |f2|/\sqrt{fw \times ft} \leq 0.40 \quad (1)$$

$$7 \leq (\Sigma d + fb)/2YD \leq 10 \quad (2)$$

Where, $f2$ is a focal length of the second lens group,
$fw$ is a focal length of a total system of the zoom lens at the wide-angle end,
$ft$ is a focal length of a total system of the zoom lens at the telephoto end,
$\Sigma d + fb$ is a distance along an optical axis from a lens surface of the zoom lens arranged closest to an object in the total system of the zoom lens to an image side focal point,
$2YD$ is $2 \times fw \times \tan \omega w$,
where $fw$ is a focal length of a total system of the zoom lens at the wide-angle end, and $\omega w$ is a maximum field angle at the wide-angle end.

Herein, it is preferable that the zoom lens satisfies the following expression (2').

$$7 \leq (\Sigma d + fb)/2YD \leq 8.6 \quad (2')$$

The structure of item 3, according to the zoom lens described in item 2, is a structure in which the second lens group includes one aspherical surface.

The structure of item 4, according to the zoom lens described in item 2 or 3, is a structure in which at least one negative lens in the second lens group satisfies the following condition.

$$n_{2N} \geq 1.8 \quad (4)$$

Where $n_{2N}$ is a refractive index of the negative lens in the second lens group for d-line.

The structure of item 5, according to the zoom lens described in any one of items 2 to 4, is a structure in which the positive lens in the second lens group satisfies the following condition.

$$\nu_{2P} \geq 30 \quad (5)$$

Where $\nu_{2P}$ is an Abbe's number of the positive lens in the second lens group.

The structure of item 6 according to the zoom lens described in any one of items 2 to 5, is a structure in which the first lens group is provided with: a negative lens; and a positive lens satisfying the following condition.

$$\nu_{1P} \geq 70 \quad (6)$$

Where $\nu_{1P}$ is an Abbe's number of the positive lens in the first lens group.

The structure of item 7, according the zoom lens described in any one of items 2 to 6, is a structure in which a third lens and a fourth lens arranged in the second lens group from the object side are cemented each other.

The structures of item 8 is an image pickup apparatus includes: the zoom lens described in any one of items 2 to 7; and an image pickup element for picking-up a light flux entering into the image pickup element through the zoom lens.

The structure of item 9, according to the zoom lens described in item 1, is a structure in which the first lens group is provided with: a negative lens; a positive lens; and a positive lens. The negative lens, the positive lens and the positive lens of the first lens group are arranged in this order from the object side of the zoom lens. The third lens group is provided with a positive lens, a positive lens and a negative lens whose surface having larger curvature faces the image side of the zoom lens arranged in this order from the object side of the zoom lens. The positive lens, the positive lens and the negative lens whose surface having stronger curvature faces the image side of the zoom lens of the third lens group are arranged in this order from the object side of the zoom lens. The forth lens group consists of two or less lenses. The zoom lens satisfies the following expression.

$$2.5 \geq \Sigma D/2YD \geq 5.0 \quad (3)$$

Where $\Sigma D$ is a sum of thickness of each lens group in the zoom lens,

2YD is $2 \times fw \times \tan \omega w$, where fw is a focal length of the total system of the zoom lens in a wide-angle end, and $\omega w$ is a maximum field angle at the wide-angle end.

Herein, it is preferable that the zoom lens satisfies the following expression (3').

$$2.7 \leq \Sigma D/2YD \leq 3.9 \quad (3')$$

The structure of item 10, according to the zoom lens described in item 9, is a structure in which the third lens group includes one aspherical surface.

The structure of item 11, according to the zoom lens described in item 9 or 10, the fourth lens group includes one aspherical surface.

The structures of item 12, according to the zoom lens described in any one of items 9 to 11, is a structure in which the second lens group comprises one aspherical surface.

The structure of item 13, according to the zoom lens described in any one of items 9 to 12, is a structure in which at least one negative lens in the second lens group satisfies the following condition.

$$n_{2N} \geq 1.8 \quad (4)$$

Where $n_{2N}$ is a refractive index of the negative lens in the second lens group for d-line.

The structure of item 14, according to the zoom lens described in any one of items 9 to 13, is a structure in which the positive lens in the second lens group satisfies the following condition.

$$\nu_{2P} \leq 30 \quad (5)$$

Where $\nu_{2P}$ is an Abbe's number of the positive lens in the second lens group.

The structure of item 15 according to the zoom lens described in any one of items 9 to 14, is a structure in which the first lens group is provided with: a negative lens; and a positive lens satisfying the following condition.

$$\nu_{1P} \geq 70 \quad (6)$$

Where $\nu_{1P}$ is an Abbe's number of the positive lens in the first lens group.

The structure of item 16, according the zoom lens described in any one of items 9 to 15, is a structure in which a third lens and a fourth lens arranged in the second lens group from the object side are cemented each other.

The structures of item 17 is an image pickup apparatus includes: the zoom lens described in any one of items 9 to 16; and an image pickup element for picking-up a light flux entering into the image pickup element through the zoom lens.

According to the structure described in item 1, this is a rear focusing type structure in which the zoom lens focuses by using the fourth lens group. Therefore, it is not only possible to avoid the effective diameter of the first lens group from becoming large, but also since the second lens group is made to have a 4-element construction with a negative power meniscus-shaped lens with a stronger curvature on the image surface side, a negative power lens, a positive power lens, and a negative power lens. Therefore, it is possible to reduce the power which each lens has and to reduce the aberration generated in this second lens group.

In addition, by satisfying the condition of Equation (1) as described in item 2, it is possible to set the refractive power of the second lens group appropriately. By being less than the upper limit of Equation (1), the moving stroke of the second lens group along the optical axis becomes short at the time of zooming, and hence it is possible to shorten the overall length of the zoom lens. By being more than the lower limit of Equation (1), it is possible to prevent the Petzval sum of the overall optical system from becoming large in the negative value. It allows obtaining satisfactory field curvature characteristics.

Further, by satisfying Equation (2), it is possible to set the overall length of the zoom lens appropriately. By being less than the upper limit of Equation (2), it is possible to shorten the overall length of the zoom lens. By being more than the lower limit of Equation (2), it is possible to have a configuration in which the second lens group and the fourth lens group that move during zooming do not interfere mechanically with other groups of lenses.

According to the structure described in item 9, the structure is the rear focusing type in which the zoom lens focuses by using the fourth lens group. Therefore, it is not only possible to avoid the effective diameter of the first lens group from becoming large, but also since the second lens group is made to have a 4-element construction with a negative power meniscus-shaped lens with a stronger curvature on the image surface side, a negative power lens, a positive power lens, and a negative power lens. Therefore, it is possible to reduce the power which each lens has and to reduce the aberration generated in this second lens group.

Further, by providing the first lens group including, in this order from the object side, a negative lens, a positive lens, and a positive lens, it is possible to reduce longitudinal chromatic aberration generated in the first lens group at the telephoto side where the incident beam diameter becomes large. In addition, by providing the third lens group including, in this order from the object side, a positive lens, a positive lens, and a meniscus-shaped negative lens having a stronger curvature on the image surface side, it is possible to place the position of the principle point on the side of the object and shorten the distance from the third lens group to the imaging surface. Further, by providing the fourth lens group having two or fewer lenses, it is possible to make thin the fourth lens group. As a result, while reducing the spacing between the third lens group and the fourth lens group, it is possible to have a structure in which the fourth lens group that moves during zooming or during focusing does not interfere mechanically with the third lens group or with the optical elements such as low-pass filter etc., provided on the image surface side.

Further, by satisfying Equation (3), it is possible to set the overall length of the zoom lens appropriately. By being lower than the upper limit of Equation (3), it is possible to have a zoom lens configuration in which the second lens group and the fourth lens group that move during zooming do not interfere mechanically with other groups of lenses or with other optical elements, while being compact. By being more than the lower limit of Equation (3), the edge thickness of each lens does not become too thin and hence it is possible to have lens shapes that are easy to fabricate.

According to the structure described in item 10, by providing the third lens group including one aspherical surface, it is possible to compensate satisfactorily for variations in the spherical aberration and comatic aberration generated during zooming the zoom lens.

According to the structure described in item 11, by providing the fourth lens group including one aspherical surface, it is possible to compensate satisfactorily for variations in the spherical aberration and comatic aberration generated during zooming and focusing the zoom lens.

According to the structures described in item 3 and item 12, by providing the second lens group including one aspherical surface, it is possible to compensate satisfactorily particularly for off-axis flare.

According to the structures described in item 4 and item 13, by satisfying Equation (4), it is possible to set appropriately the Petzval sum of the overall optical system. By being more than the lower limit of Equation (4), it is possible to prevent the Petzval sum of the overall optical system from becoming large on the negative value. It allows obtaining satisfactory field curvature characteristics.

According to the structures described in item 5 and item 14, by satisfying Equation (5), it is possible to reduce the chromatic aberration generated in the second lens group. By being lower than the upper limit of Equation (5), it is possible to act so as to cancel out the chromatic aberration generated in the negative lens in the second lens group. It allows reducing the chromatic aberration generated in the second lens group.

According to the structures described in item 6 and item 15, by satisfying Equation (6), it is possible to suppress to a suitable value the longitudinal chromatic aberration generated in the first lens group on the telephoto side. By providing the first lens group totally having a positive power including a negative lens and a positive lens satisfying Equation (6), it is possible to reduce the longitudinal chromatic aberration generated in the first lens group on the telephoto side.

According to the structures described in item 7 and item 16, by making the third and fourth lenses of the second lens group cemented lenses, it is possible to have a compact zoom lens structure without the presence of an air gap layer between the third and the fourth lenses.

According to the structures described in item 8 and item 17, by providing an image pickup apparatus including the zoom lens described in any one of items 1, 2 to 7 and 9 to 16, it is possible to obtain a image pickup apparatus having a high zoom ratio, being compact, being short for the overall length, having a high resolution over the entire photographing range.

While the preferred embodiments of the present invention have been described using specific terms, such description is for illustrative purposes only, and it is to be understood that changes and variations may be made without departing from the sprit or scope of the appended claims.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

Figure 2A:
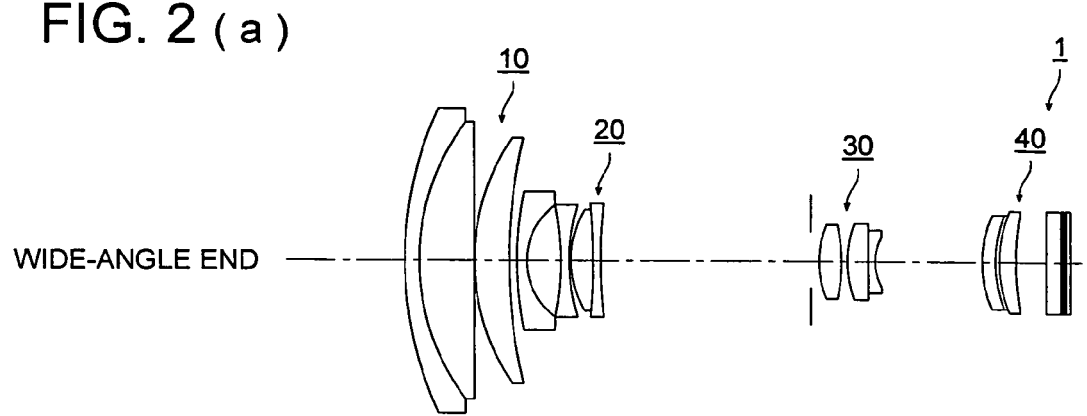
Figure 2B:
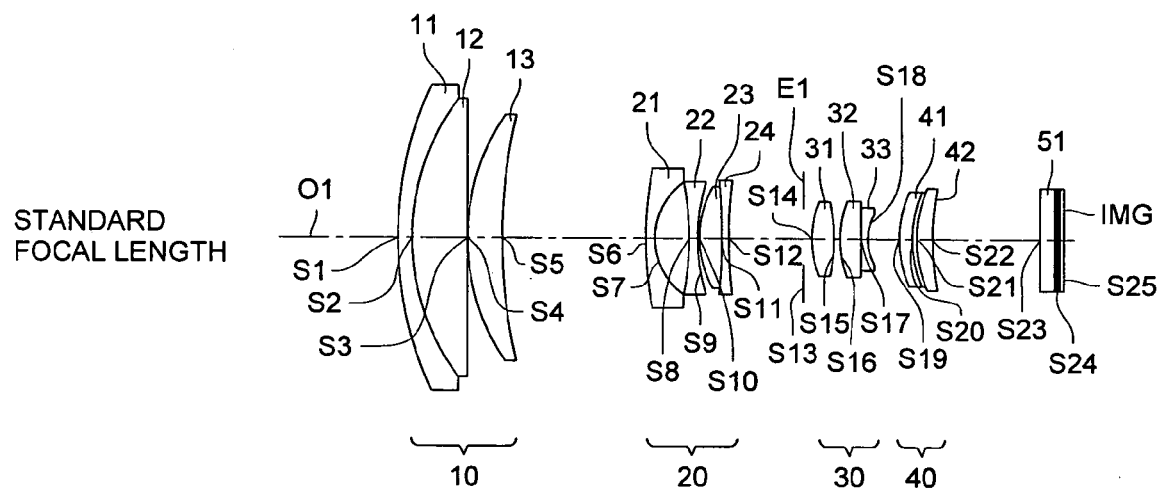
Figure 2C:
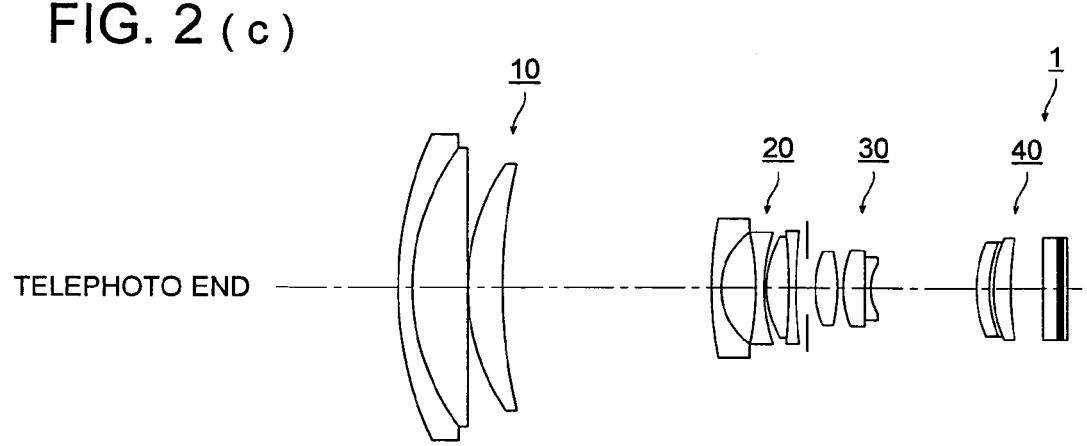
Figure 4:
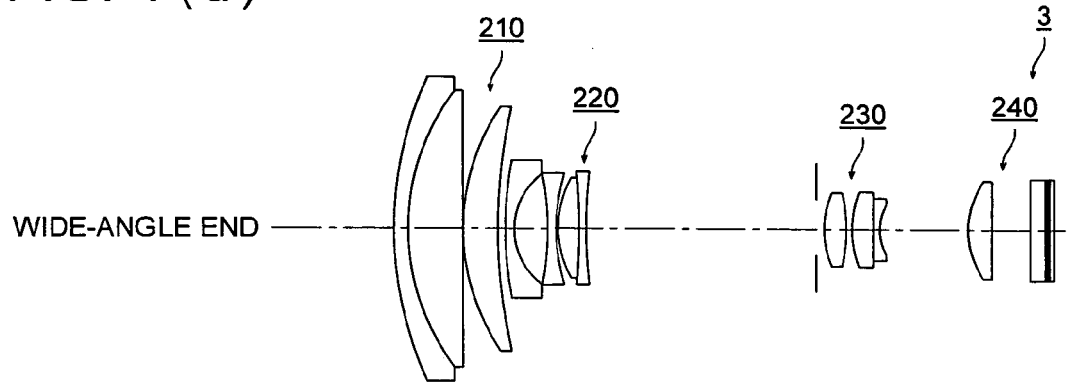
Figure 4:
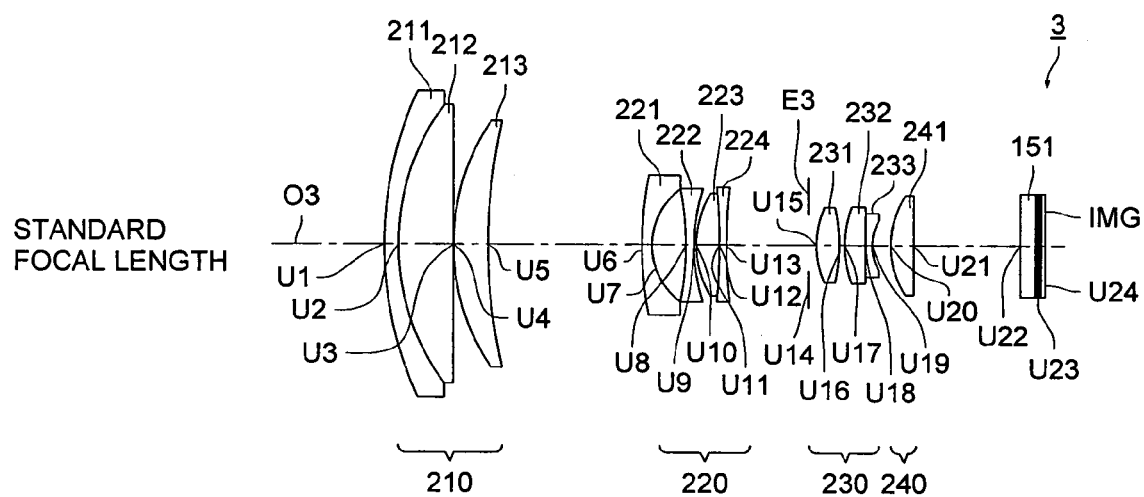
Figure 4:
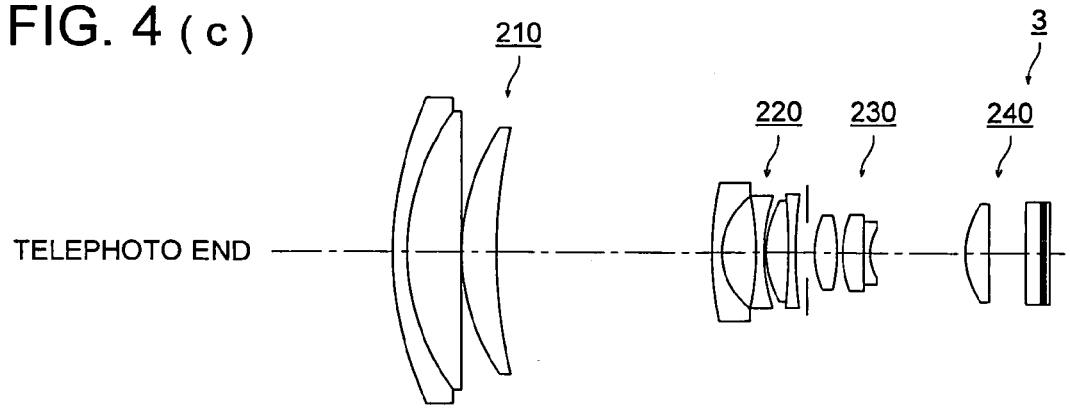
Figure 5A:
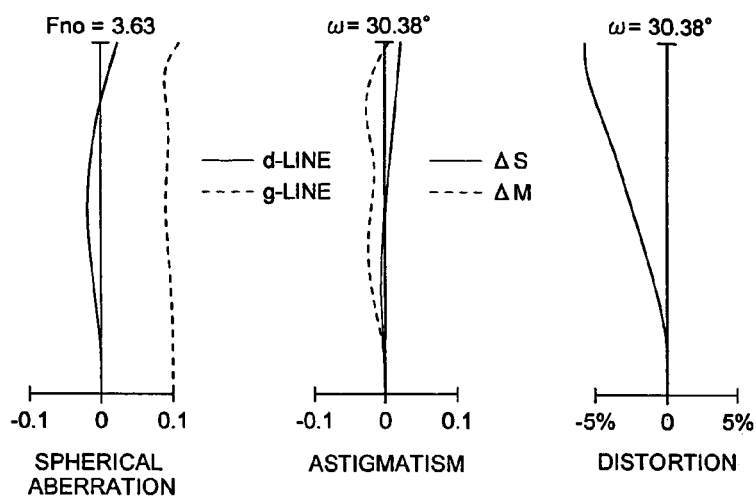
Figure 5B:
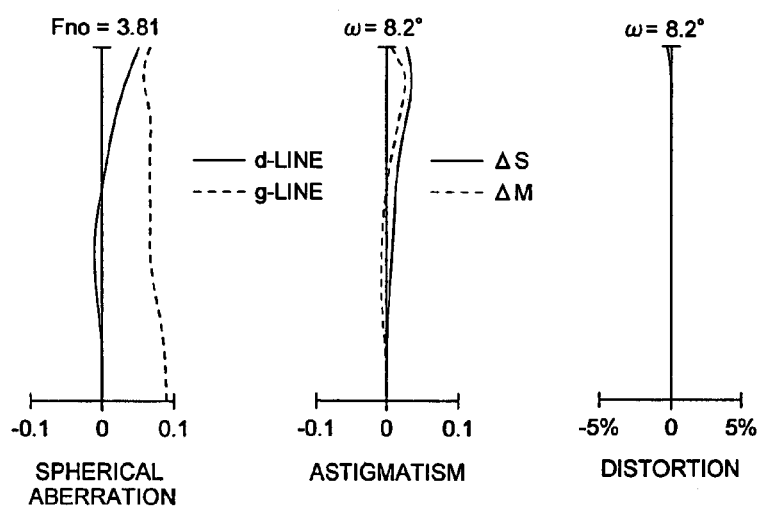
Figure 5C:
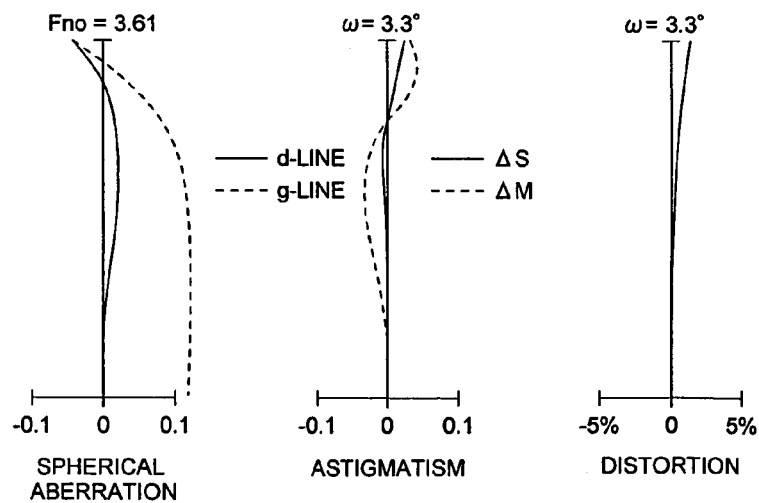
Figure 6A:
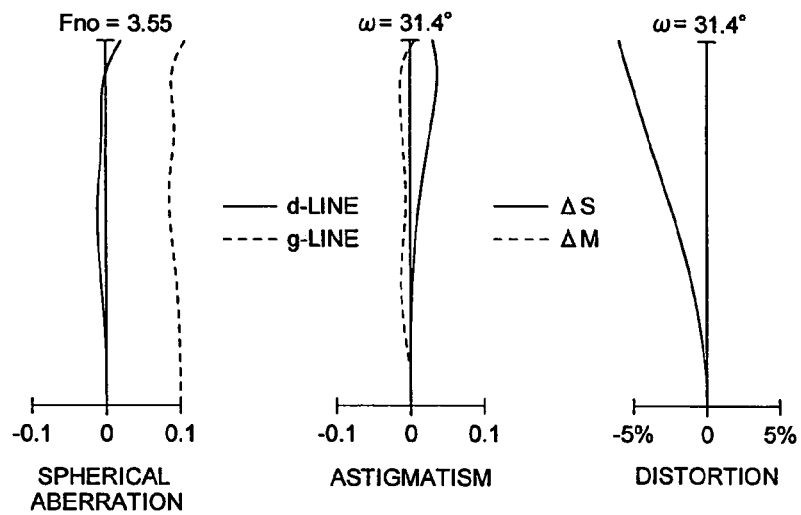
Figure 6B:
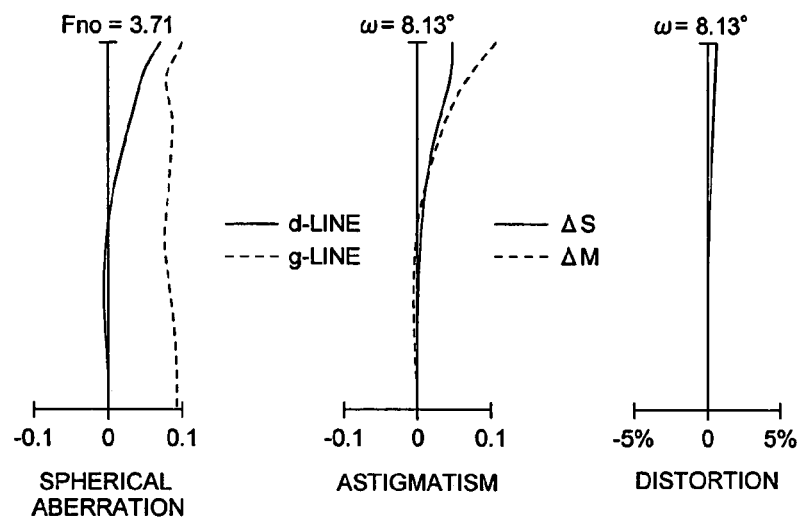
Figure 6C:
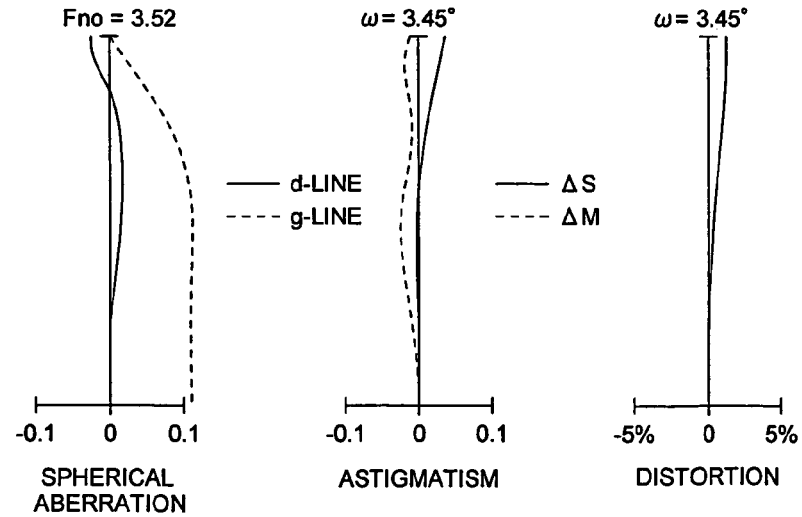
Figure 7:
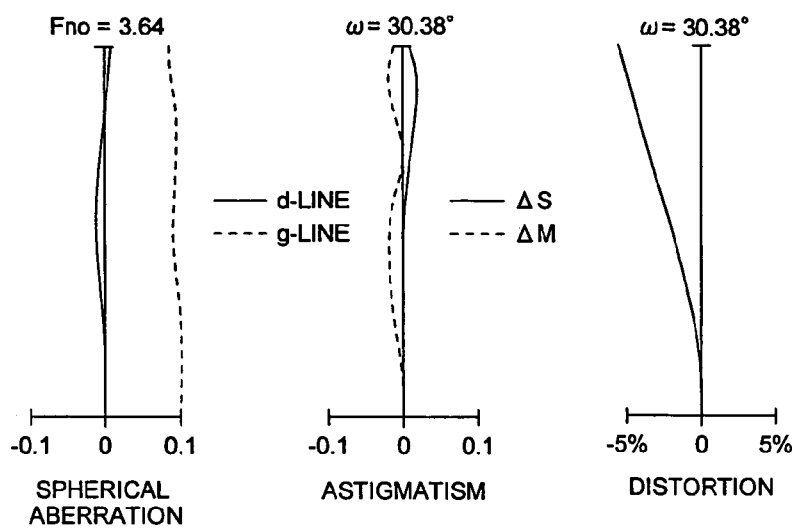
Figure 7:
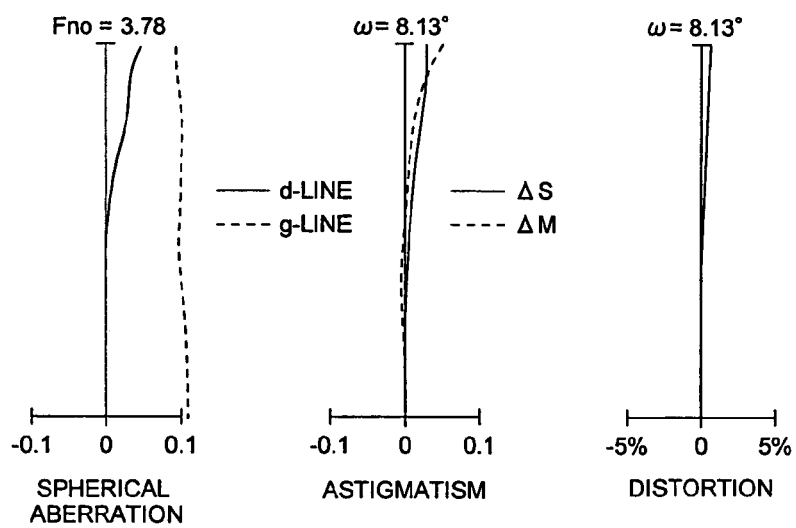
Figure 7:
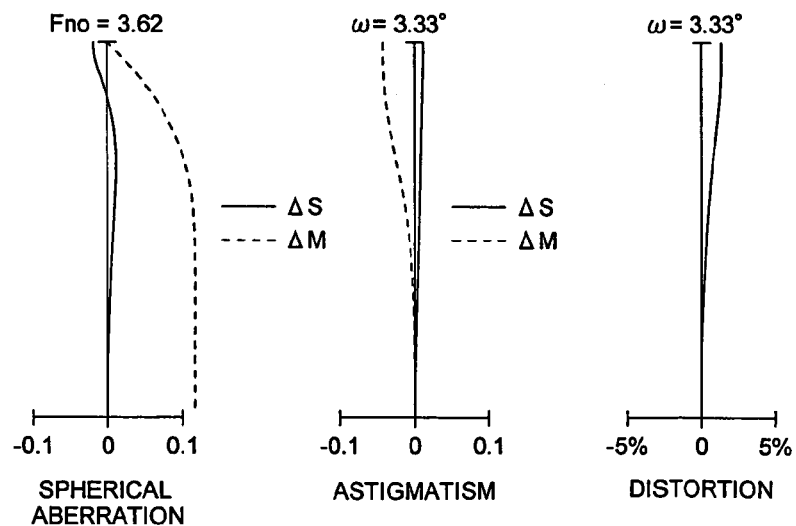
Figure 8:
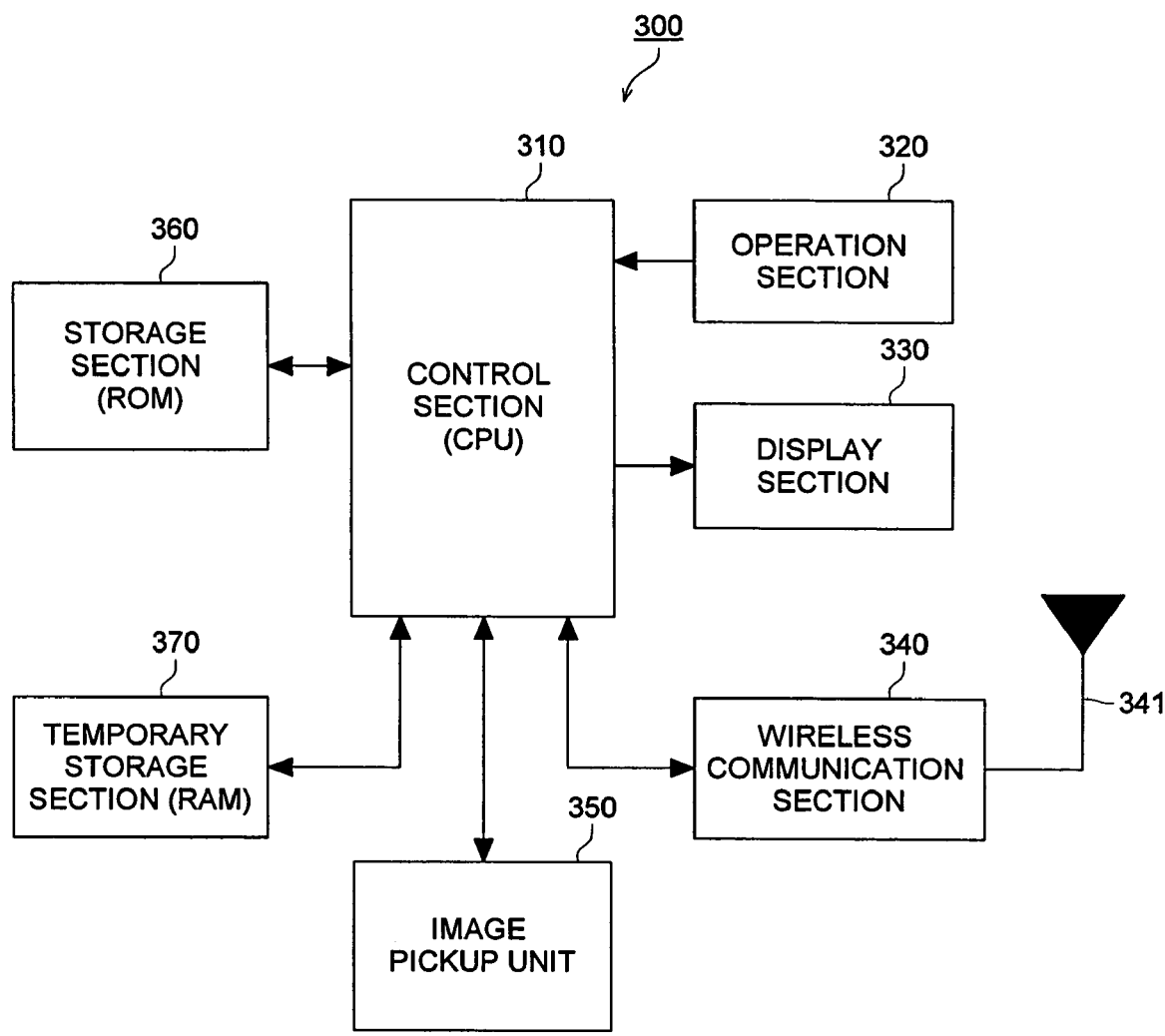

Each of FIGS. 2(a) to 2(c) is the figure showing the configurations of the zoom lens 1 included in the optical system 101;

FIG. 2(a) is the configuration of the zoom lens 1 at the wide-angle end;

FIG. 2(b) is the configuration of the zoom lens 1 with stan dard focal length;

FIG. 2(c) is the configuration of the zoom lens 1 at the telephoto end;

Each of FIGS. 3(a) to 3(c) is the figure showing the configurations of the zoom lens 2 included in the optical system 101;

FIG. 3(a) is the configuration of the zoom lens 2 at the wide-angle end;

FIG. 3(b) is the configuration of the zoom lens 2 with stan dard focal length;

FIG. 3(c) is the configuration of the zoom lens 2 at the telephoto end;

Each of FIGS. 4(a) to 4(c) is the figure showing the configurations of the zoom lens 3 included in the optical system 101;

FIG. 4(a) is the configuration of the zoom lens 3 at the wide-angle end;

FIG. 4(b) is the configuration of the zoom lens 3 during stan dard focal length;

FIG. 4(c) is the configuration of the zoom lens 3 at the telephoto end;

FIG. 5(a) is a figure showing the spherical aberration, astigmatic aberration, and distortion of the zoom lens 1 at the wide-angle end in the example 1;

FIG. 5(b) is a figure showing the spherical aberration, astigmatic aberration, and distortion of the zoom lens 1 during stan dard focal length;

FIG. 5(c) is a figure showing the spherical aberration, astigmatic aberration, and distortion of the zoom lens 1 at the telephoto end;

FIG. 6(a) is a figure showing the spherical aberration, astigmatic aberration, and distortion of the zoom lens 2 at the wide-angle end in the example 2;

FIG. 6(b) is a figure showing the spherical aberration, astigmatic aberration, and distortion of the zoom lens 2 during stan dard focal length;

FIG. 6(c) is a figure showing the spherical aberration, astigmatic aberration, and distortion of the zoom lens 2 at the telephoto end;

FIG. 7(a) is a figure showing the spherical aberration, astigmatic aberration, and distortion of the zoom lens 1 at the wide-angle end in the example 3;

FIG. 7(b) is a figure showing the spherical aberration, astigmatic aberration, and distortion of the zoom lens 1 during stan dard focal length;

FIG. 7(c) is a figure showing the spherical aberration, astigmatic aberration, and distortion of the zoom lens 1 at the telephoto end; and FIG. 8 is a block diagram showing the internal configuration of the mobile telephone unit 300.

DETAILED DESCRIPTION OF THE INVENTION

In the following, some preferred embodiments of the present invention and their examples are described in the following referring to the attached figures. However, the scope of the present invention shall not be construed to be limited to the examples described here.

First Embodiment

Figure 1:
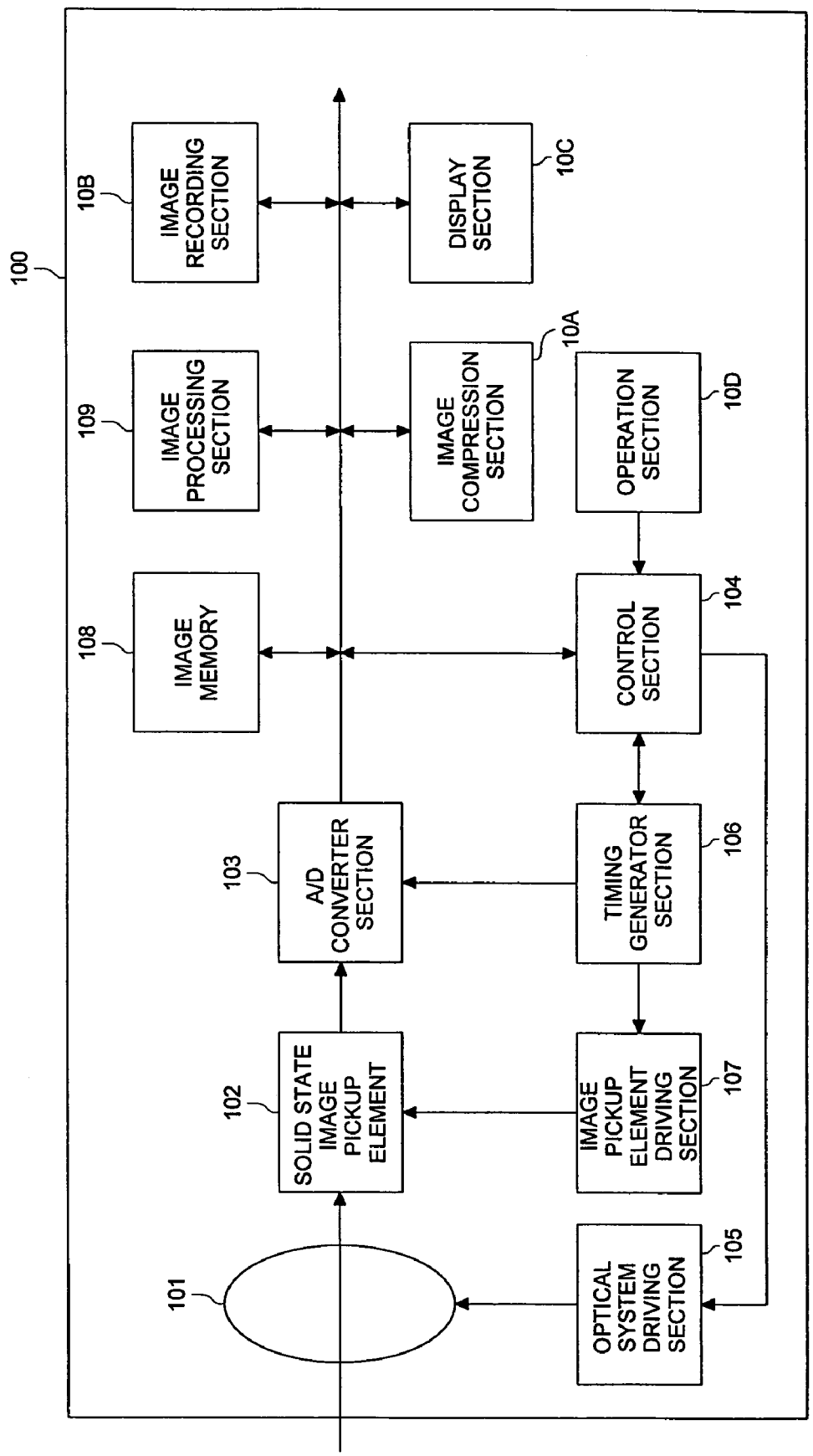
FIG. 1 is the diagram showing the internal configuration of a digital still camera 100 according to the first embodiment of the present invention.

The equipment configuration of the present preferred embodiment is described here referring to FIG. 1 and FIGS. 2(*a*) to 2(*c*). The internal configuration of the digital still camera 100 according to the present preferred embodiment is shown in FIG. 1.

As is shown in FIG. 1, the digital still camera as an image pickup apparatus 100 has a configuration in which it is provided with an optical system 101, a solid state image pickup element 102, an A/D converter section 103, a control section 104, an optical system driving section 105, a timing generator section 106, an image pickup element driving section 107, an image memory 108, an image processing section 109, an image compression section 10A, an image recording section 10B, a display section 10C, and an operation section 10D.

The optical system 101 is an optical system that includes the zoom lens 1 to be described later, and the light from the photographed object enters into the optical system 101. The solid state image pickup element 102 is an image pickup element such as a CCD or a CMOS device, and outputs the analog signal corresponding to the incident light after carrying out photoelectric conversion for each of the colors R, G, and B. The A/D converter section 103 converts these analog signals into digital image data.

The control section 104 controls the different sections of the digital still camera 100. The control section 104 includes a CPU (Central Processing Unit), a RAM (Random Access Memory), a ROM (Read Only Memory) and executes various types of operations due to the co-operation between the CPU and the different types of programs read out from the ROM and stored in the RAM.

Under control of the control section 104, the optical system driving section 105 drives and controls the optical system 101 during zooming and/or focusing the zoom lens (moving the second lens group 20 and the fourth lens 40 to be described later), and during exposure. The timing generator section 106 outputs the timing signal for analog signal output. The image pickup element driving section 107 carries out the scanning drive control of the solid state image pickup element 102.

The image memory 108 stores the image data in a readable and writable manner. The image processing section 109 carries out various types of image processing. In the image compression section 10A compresses the photographed image data using a compression method such as JPEG (Joint Photographic Experts Group). The image recording section 10B records image data in a recording media such as an SD (Secure Digital) memory card, memory stick, xD picture card, etc., set in the slot not shown in the figure.

The display section 10C is a color liquid crystal display panel etc., which displays the image data after photographed, the through image before photographing, and various types of operation screen. The operation section 10D includes various types of operation keys such as the release button, various types of mode buttons, and outputs the information input by the user's operations to the control section 104.

Next, the operations in the digital still camera 100 are explained here. Either monitoring of the subject (through image display) or photographing of the subject image is carried out, at the time of photographing a subject. During monitoring, the image of the photographed subject obtained through the optical system 101 is formed on the light receiving surface of the solid state image pickup element 102. The solid state image pickup element 102 placed at the rear of the optical system 101 along the optical axis for photographing is driven and scanned by the image pickup element driving section 107 and the timing generator section 106. Then, one frame of an analog signal which is the photoelectric conversion output corresponding to the optical image formed per a specific interval is outputted.

The analog signal is converted into digital data in the A/D converter section 103 after appropriate gain adjustment is made for each of the fundamental color components of R, G, and B. The image processing section 109 applies color processing including pixel interpolation processing and γ-correction to this digital data and generates the corresponding digital values of the brightness signal Y and the color difference signals Cb and Cr (image data). The corresponding digital values of the brightness signal Y and the color difference signals Cb and Cr are stored in the image memory 108, and these signals are periodically read out to generate the video signal which is output in the display section 10C.

The display section 10C acts as an electronic viewfinder during monitoring and displays the photographed image in real time. In this condition, the zooming, focusing, and exposure etc., of the optical system 101 are set by driving the optical system driving section 105 based on the operation inputs made by the user at all times using the operation section 10D.

In such a monitoring condition, at the instant of wanting to take a still photograph, a still photograph is taken when the user depresses the release button in the operation section 10D. At the time the release button is depressed, one frame of image data stored in the image memory 108 is read out and is compressed by the image compression section 10A. This compressed image data is recorded in the recording medium by the image recording section 10B.

FIGS. 2(*a*) to 2(*c*) are figures showing the configurations of the zoom lens 1 included in the optical system 101. FIG. 2(*a*) shows the configuration of the zoom lens 1 when it is set at the wide-angle end. FIG. 2(*b*) is the configuration of the zoom lens 1 when it is set at the normal focal length. FIG. 2(*c*) is the configuration of the zoom lens 1 when it is set at the telephoto end.

As shown in FIGS. 2(*a*) to 2(*c*), the zoom lens 1 is provided with: a first lens group 10 with a positive refractive power, a second lens group 20 with a negative refractive power, an opening aperture E1, a third lens group 30 with a positive refractive power, a fourth lens group 40 with a positive refractive power, and a cover glass 51, arranged in this order from the object side (the photographed subject side) towards the image surface IMG side along the optical axis O1. The image surface IMG is the light receiving surface of the solid-state image pickup element 102. Further, a low pass filter and an infrared cut-off filter, etc., can also be provided at the front of the cover glass 51.

When the zoom lens 1 is zoomed between the wide-angle end and the telephoto end (as shown in structures from FIG.

2(a) to FIG. 2(c) through FIG. 2(b), or, from FIG. 2(c) to FIG. 2(a) through FIG. 2(b)) and/or focused, the first lens group 10, the third lens group 30, and the opening aperture E1 are statically positioned along the optical axis O1. However, it is not necessary to restrict to this. For example, there can be provided a structure such that the position of the opening aperture E1 moves along the optical axis O1 during the above zooming and focusing.

Further, when the zoom lens is zoomed, the zoom lens moves the position of the second lens group 20 along the optical axis O1, and corrects the focus movement caused by the zooming by changing the position of the fourth lens group 40 along the optical axis O1. Further, during focusing, the position of the fourth lens group 40 changes along the optical axis O1.

The first lens group 10 is provided with: a negative lens 11 with a negative refractive power, a positive lens 12 with a positive refractive power, and a positive lens 13 with a positive refractive power, arranged in this order from the object side towards the image surface IMG side along the optical axis O1. In addition, a cemented lens is formed by the negative lens 11 and the positive lens 12. The negative lens 11 and the positive lens 12 have the surfaces S1–S3, and the positive lens 13 has the surfaces S4 and S5, from the object side towards the imaging surface IMG side, in this order along the optical axis O1.

The second lens group 20 provided with: a meniscus-shaped negative lens 21 whose concave surface is facing the imaging surface side and whose surface (Surface S7) on the side of the imaging surface has an aspherical shape, a negative lens 22, a positive lens 23, and a negative lens 24, arranged in this order from the object side towards the imaging surface IMG side along the optical axis O1. Further, a cemented lens is formed by the positive lens 23 and the negative lens 24. The negative lens 21 has the surfaces S6 and S7, the negative lens 22 has the surfaces S8 and S9, and the positive lens 23 and the negative lens 24 have the surfaces S10–S12, from the object side towards the imaging surface side IMG, sequentially along the optical axis O1.

The third lens group 30 is positioned in the vicinity of the image side of the opening aperture E1 along the optical axis O1, and is provided with a positive lens 31 whose both surfaces have aspherical shapes, a positive lens 32, a negative lens 33 that has a strong curvature on the imaging surface IMG side. Further, a cemented lens is formed by the positive lens 32 and the negative lens 33. The opening aperture E1 has the surface S13, the positive lens 31 has the surfaces S14 and S15, the positive lens 32 and the negative lens 33 have the surfaces S16–S18, from the object side towards the imaging surface IMG side, in this order along the optical axis O1.

The fourth lens group 40 is provided with: a lens 41 whose both surfaces have aspherical shapes and a positive lens 42. From the object side towards the imaging surface IMG side, sequentially along the optical axis O1, the lens 41 has the surfaces S19 and S20, and the positive lens 42 has the surfaces S21 and S22, arranged in this order from the object side towards the imaging surface IMG side along the optical axis O1. The cover glass 51 has the surfaces S23 and S24, and the imaging surface IMG is taken as the surface S25, from the object side towards the imaging surface IMG side in this order along the optical axis O1.

Each aspherical surface of the lenses is expressed by the following Equation (7) in an orthogonal coordinate system taking the apex point of the surface as the origin, and the direction of the optical axis as the X-axis, where K is a conical constant of the aspherical surface, $A_4$, $A_6$, $A_8$, and $A_{10}$ are aspherical surface constants as, and R is a paraxial curvature.

$$X = \frac{h^2/R}{1+\sqrt{1-(K+1)h^2/R^2}} + A_4h^4 + A_6h^6 + A_8h^8 + A_{10}h^{10} \quad (7)$$

Where, $h = \sqrt{Y^2 + Z^2}$.

Further, each of the lens groups of the zoom lens 1 satisfies the following equations (1) and (2).

$$0.23 \leq |f2/\sqrt{fw \times ft}| \leq 0.40 \quad (1)$$

$$7 \leq (\Sigma d + fb)/2YD \leq 10 \quad (2)$$

Where f2 is a focal length of the second lens group, fw is a focal length of the total system of the zoom lens at a wide-angle end, ft is a focal length of the total system of the zoom lens at a telephoto end, $\Sigma d + fb$ is a distance along an optical axis from a lens surface of the zoom lens arranged closest to an object in the total system of the zoom lens to an image side focal point, and 2YD is 2×fw×tan ωw, where fw is a focal length of the total system of the zoom lens in a wide-angle end, and ωw is a maximum field angle at the wide-angle end.

Herein, it is preferable that the zoom lens satisfies the following expression (2').

$$7 \leq (\Sigma d + fb)/2YD \leq 8.6 \quad (2')$$

Further, each of the lens groups of the zoom lens 1 satisfies the following equation (3).

$$2.5 \leq \Sigma D/2YD \leq 5.0 \quad (3)$$

Where $\Sigma D$ is a sum of thickness of each lens group in the zoom lens,

2YD is 2×fw×tan ωw, where fw is a focal length of the total system of the zoom lens in a wide-angle end, and ωw is a maximum field angle at the wide-angle end.

Herein, it is preferable that the zoom lens satisfies the following expression (3').

$$2.7 \leq \Sigma D/2YD \leq 3.9 \quad (3')$$

Further, at least one of the negative lenses of the second lens group 20 (at least one of the negative lenses 21, 22, and 24) satisfies the following equation (4).

$$n_{2N} \geq 1.8 \quad (4)$$

Where $n_{2N}$ is a refractive index of the negative lens of the second lens group 20 for the d line.

Further, the positive lens 23 of the second lens group 20 satisfies the following equation (5).

$$\nu_{2P} \leq 30 \quad (5)$$

Where $\nu_{2P}$ is the Abbe's number of the positive lens of the second lens group.

Further, the positive lenses 12 and 13 of the first group of lens 10 satisfy the following equation (6).

$$\nu_{1P} \geq 70 \quad (6)$$

Where $\nu_{1P}$ is the Abbe's number of the positive power lenses of the first lens group.

The conventional configuration formed by four lens groups focusing by moving the first lens group, was not suitable for making the lens compact because the effective radius of the first lens group becomes large. However, the embodiment according to the present invention can prevent the effective diameter of the first lens group 10 from becoming large, since the configuration is the rear focusing type in which the focusing is done using the fourth lens group 40. In addition, by making the second lens group 20 have a 4-element configuration provided with a meniscus-shaped negative lens 21 whose concave surface is facing the imaging surface IMG side, a negative lens 22, a positive lens 23, and another positive lens 24, it is possible to reduce the power which each lens has and to reduce the aberration generated in this second lens group 20.

Further, by satisfying the equation (1), it is possible to set the refractive power of the second lens group 20 to a suitable value. By being less than the upper limit of the equation (1), the moving stroke of the second lens group 20 along the optical axis O1 for zooming becomes short, and hence it is possible to shorten the overall length of the zoom lens 1. By being more than the lower limit of the equation (1), it is possible to prevent the Petzval sum of the entire optical system from becoming large in the negative value, and to obtain satisfactory field curvature characteristics.

Further, by satisfying the equation (2), it is possible to set appropriately the overall length of the zoom lens 1. By being lower than the upper limit of the equation (2), it is possible to shorten the overall length of the zoom lens 1. By being more than the lower limit of the equation (2), it is possible to have a configuration in which the second lens group 20 and the fourth lens group 40 do not interfere mechanically with other lens groups (10 and 30).

Further, by providing the first lens group 10 including a negative lens 11, a positive lens 12, and a positive lens 13 in this order from the object side, it is possible to reduce the longitudinal chromatic aberration generated in the first lens group at the telephoto side in which the incident beam diameter becomes large. In addition, by making the third lens group 30 provided with: a positive lens 31, a positive lens 32, a negative lens 33 that has a stronger curvature on the imaging surface IMG side, arranged in this order from the object side, it is possible to place the position of the principal point on the object side, and to shorten the distance from the third lens group 30 to the imaging surface IMG. Further, by providing a 2-element configuration of the fourth lens group 40 including the lens 41 and the positive lens 42, it is possible to make thin the fourth lens group 40. As a result, while it is possible to shorten the spacing between the third lens group 30 and the fourth lens group 40, it is possible to have a configuration in which there is no mechanical interference between the fourth lens group 40 that moves during zooming and focusing and the third lens group, or the optical elements such as the cover glass 51 placed on the imaging surface IMG side.

Further, by satisfying the Equation (3), it is possible to set appropriately the overall length of the zoom lens 1. By being lower than the upper limit of the equation (3), not only the unit becomes compact but also the configuration of the zoom lens 1 can be made such that the second lens group 20 or the fourth lens group 40 does not interfere with the other groups of lenses (10 and 30) nor with other optical elements. By being more than the lower limit of the equation (3), the edge thickness of each lens does not become too thin and hence it is possible to have lens shapes that are easy to fabricate.

In addition, by providing the third lens group 30 including at least one aspherical surface (the surfaces S14 and S15 in the embodiment of the present invention), it is possible to correct satisfactorily the change of the spherical aberration and the comatic aberration caused by zooming.

Further, by providing the fourth lens group 40 including at least one aspherical surface (the surfaces S19 and S20 in the present preferred embodiment), it is possible to correct satisfactorily the change of the spherical aberration and the comatic aberration caused by zooming.

Further, by providing the second lens group 20 including at least one aspherical surface (the surface S7 in the embodiment of the present invention), it is possible particularly to correct the off-axis flare.

Further, by satisfying the equation (4), it is possible to set appropriately the Petzval sum of the overall optical system. By being more than the lower limit of the equation (4), it is possible to prevent the Petzval sum of the overall optical system from becoming too large on the negative side, and to obtain satisfactory field curvature characteristics.

Further, by satisfying the equation (5), it is possible to reduce the chromatic aberration generated in the second lens group 20. By being lower than the upper limit of the equation (5), it operates to cancel out the chromatic aberration generated by the negative lenses 21, 22, and 24 in the second lens group 20, and it is possible to reduce the chromatic aberration generated in the second lens group 20.

Further, by satisfying the Equation (6), it is possible to suppress to an appropriate value the longitudinal chromatic aberration generated in the first lens group 10 in the telephoto side. Normally, when maintaining the F-number to approximately constant under the state change from the wide-angle end to the telephoto end, the diameter of the light beam entering the first lens group becomes larger on the telephoto side. Therefore, the longitudinal chromatic aberration generated in the first lens group becomes larger thereby resulting in lower resolution. However, by providing the first lens group 110 totally having a positive power and including a negative lens 11, positive lenses 12 and 13 satisfying the Equation (6) as shown in the embodiment of the present invention, it is possible to reduce the longitudinal chromatic aberration generated in the first lens group 10. It is still more preferable that the zoom lens satisfies $v_{1P} \geq 75$.

In addition, by providing an image pickup apparatus including a zoom lens 1, it is possible to obtain a digital still camera 100, which is an image pickup apparatus with a high zoom ratio and that is both compact and has a high resolution over the entire photographing range.

First Modified Embodiment

A first modified embodiment of the above first embodiment is described here referring to FIGS. 3(a) to 3(c). In this modified embodiment, the zoom lens 1 of the above first embodiment has been changed to the configuration of the zoom lens 2, and the points of difference of this zoom lens 2 relative to the zoom lens 1 are mainly described below.

The configuration of the zoom lens 2 included in the optical system 101 is shown in FIGS. 3(a) to 3(c). The configuration of the zoom lens 2 at the wide-angle end is shown in FIG. 3(a). The configuration of the zoom lens 2 with normal focal length is shown in FIG. 3(b). The configuration of the zoom lens 2 at the telephoto end is shown in FIG. 3(c).

As shown in FIGS. 3(a) to 3(c), the zoom lens 2 is provided with: a first lens group 110 with positive refractive power, a second lens group 120 with a negative refractive power, an opening aperture E2, a third lens group 130 with a positive refractive power, a fourth lens group 140 with positive refractive power, and a cover glass 151, arranged in this order from the object side towards the imaging surface IMG side along the optical axis O2. The first lens group 110, the second lens group 120, the opening aperture E2, the third lens group 130, the fourth lens group 140, and the cover glass 151 corresponds to the first lens group 10, the second lens group 20, the opening aperture E1, the third lens group 30, the fourth lens group 40, and the cover glass 51 of the zoom lens 1, respectively.

Similarly to the first lens group 10, the first lens group 110 is provided with: a cemented lens of a negative lens 111 and a positive lens 112, and a positive lens 113, and has the surfaces T1–T5, in this order from the object side towards the imaging surface IMG side along the optical axis O2.

Similarly to the second lens group 20, the second lens group 120 is provided with: a meniscus-shaped negative lens 121 whose concave surface is facing the imaging surface side and whose surface (Surface T7) on the side of the imaging surface has an aspherical shape, a negative lens 122, and a cemented lens formed of a positive lens 123 and a negative lens 124, and has the surfaces T6–T12, in this order from the object side towards the imaging surface IMG side along the optical axis O2.

The opening aperture E2 has the surface T13. Similarly to the third lens group 30, the third lens group 130 is provided with: a positive lens 131 whose both surfaces have aspherical shape, a cemented lens comprising a positive lens 132 and a negative lens 133 that has a strong curvature on the imaging surface side, and has the surfaces T14–T18, in this order from the object side towards the imaging surface IMG side along the optical axis O2.

The fourth lens group 140 is provided with: a positive lens 141, in this order from the object side towards the imaging surface IMG side along the optical axis O2. The positive lens 141 has the surfaces T19 and T20, in this order from the object side towards the imaging surface IMG side along the optical axis O2. The cover glass 151 has the surfaces T21 and T22, in this order from the object side towards the imaging surface IMG side along the optical axis O2. Further, the imaging surface IMG is the surface T23.

Further, the zoom lens 2 satisfies the above Equations (1)–(6), (2') and (3').

According to this modified embodiment, an effect similar to that of the zoom lens 1 of the above first embodiment is obtained in the zoom lens 2. Further, by forming the fourth lens group 140 with a single positive lens 141 it is possible to reduce further the thickness of the fourth lens group. As a result, while it is possible to shorten further the spacing between the third lens group 130 and the fourth lens group 140, it is possible to have a configuration in which there is no mechanical interference between the fourth lens group 140 that moves during zooming and focusing and the third lens group 130, or the optical elements such as the cover glass 151 placed on the imaging surface IMG side.

Second Modified Embodiment

A second modified embodiment of the above first embodiment is described here referring to FIGS. 4(a) to 4(c). In this modified embodiment, the zoom lens 2 of the above first modified embodiment has been changed to the configuration of the zoom lens 3, and the points of difference of this zoom lens 3 relative to the zoom lens 2 are mainly described below.

FIGS. 4(a) to 4(c) are the figures showing the configurations of the zoom lens 3 included in the optical system 101. FIG. 4(a) is the configuration of the zoom lens 3 at the wide-angle end. FIG. 4(b) is the configuration of the zoom lens 3 with standard focal length. FIG. 4(c) is the configuration of the zoom lens 3 at the telephoto end.

As shown in FIGS. 4(a) to 4(c), the zoom lens 3 is provided with, a first lens group 210 with a positive refractive power, a second lens group 220 with a negative refractive power, an opening aperture E3, a third lens group 230 with a positive refractive power, a fourth lens group 240 with a positive refractive power, and a cover glass 251, arranged in this order from the object side towards the image surface IMG side along the optical axis O3. The first lens group 210, the second lens group 220, the opening aperture E3, the third lens group 230, the fourth lens group 240, and the cover glass 251 correspond to the first lens group 110, the second lens group 120, the opening aperture E2, the third lens group 130, the fourth lens group 140, and the cover glass 151 of the zoom lens 1, respectively.

Similarly to the first lens group 110, the first lens group 210 is provided with a cemented lens having a negative lens 211 and a positive lens 212, and a positive lens 213, and has the surfaces U1–U5, in this order from the object side towards the image surface IMG side along the optical axis O3.

The second lens group 220 is provided with a meniscus-shaped negative lens 221 whose concave surface is facing the imaging surface side and whose surface (Surface U7) on the side of the imaging surface has an aspherical shape, a negative lens 222, a positive lens 223, and a negative lens 224, in this order from the object side towards the image surface IMG side along the optical axis O3. The negative lens 221 has the surfaces U6 and U7, the negative lens 222 has the surfaces U8 and U9, the positive lens 223 has the surfaces U10 and U11, and the negative lens 224 has the surfaces U12 and U13, in this order from the object side towards the image surface IMG side along the optical axis O3.

The opening aperture E3 has the surface U14. Similarly to the third lens group 130, the third lens group 230 is provided with a positive lens 231 whose both surfaces have aspherical shapes, a cemented lens comprising a positive lens 232 and a negative lens 233 that has a strong curvature on the imaging surface side, and has the surfaces U15–U19, in this order from the object side towards the imaging surface IMG side along the optical axis O3.

The fourth lens group 240 is provided with a positive lens 241, in this order from the object side towards the imaging surface IMG side along the optical axis O3. The positive lens 241 has the surfaces U20 and U21, in this order from the object side towards the imaging surface IMG side along the optical axis O3. The cover glass 251 has the surfaces U22 and U23, in this order from the object side towards the imaging surface IMG side along the optical axis O3. Further, the imaging surface IMG is the surface U24.

Further, the zoom lens 3 satisfies the above equations (1)–(6), (2') and (3').

According to this modified embodiment, an effect similar to that of the zoom lens 2 of the above first modified embodiment is obtained in the zoom lens 3.

EXAMPLE 1

A concrete first Example related to the above first embodiment is described here. The zoom lens 1 of this example satisfies the following Table 1.

TABLE 1

(a)

| Group | Surface | R | Dj | ndj | vj |
|---|---|---|---|---|---|
| 1 | 1 | 33.723 | 1.10 | 1.84666 | 23.7 |
|  | 2 | 21.406 | 4.91 | 1.496999 | 81.6 |
|  | 3 | 479.411 | 0.20 |  |  |
|  | 4 | 20.806 | 3.10 | 1.729157 | 54.6 |
|  | 5 | 63.989 | Variable |  |  |
| 2 | 6 | 26.227 | 0.80 | 1.882997 | 40.7 |
|  | 7* | 6.072 | 3.14 |  |  |
|  | 8 | −19.505 | 0.60 | 1.729157 | 54.6 |
|  | 9 | 10.617 | 0.29 |  |  |
|  | 10 | 9.183 | 2.00 | 1.846659 | 23.7 |
|  | 11 | −124.440 | 0.60 | 1.743997 | 44.7 |
|  | 12 | 32.000 | Variable |  |  |
| Opening aperture | 13 | 1E+18 | 0.60 |  |  |
| 3 | 14* | 7.585 | 2.00 | 1.583126 | 59.3 |
|  | 15* | −22.105 | 0.38 |  |  |
|  | 16 | 7.936 | 2.10 | 1.518229 | 58.9 |
|  | 17 | 48.162 | 0.60 | 1.805181 | 25.4 |
|  | 18 | 5.460 | Variable |  |  |
| 4 | 19* | 12.720 | 1.00 | 1.525 | 56 |
|  | 20* | 12.376 | 0.40 |  |  |
|  | 21 | 8.258 | 1.70 | 1.48749 | 70.2 |
|  | 22 | 30.424 | Variable |  |  |
|  | 23 | 1.00E+18 | 1.48 | 1.5488 | 66.9 |
|  | 24 | 1.00E+18 | 0.5 | 1.51633 | 64.1 |
|  | 25 | 1.00E+18 |  |  |  |

(b)

|  | Seventh surface S7 | Fourteenth surface S14 | Fifteenth surface S15 | Nineteenth surface S19 | Twentieth surface S20 |
|---|---|---|---|---|---|
| K | 4.3054E−01 | −1.5996E−01 | −4.2247E+00 | 2.6468E+00 | 6.3266E+00 |
| $A_4$ | −9.0615E−05 | −2.7631E−05 | 3.1333E−04 | 1.0420E−03 | 9.7122E−04 |
| $A_6$ | −9.5750E−06 | 2.7188E−05 | 4.1583E−05 | −4.0682E−06 | −1.2893E−05 |
| $A_8$ | 6.0159E−07 | −1.7970E−06 | −3.3715E−06 | −1.3482E−06 | −5.7154E−07 |
| $A_{10}$ | −3.2949E−08 | 1.9761E−07 | 3.1188E−07 | 5.2175E−08 | −2.7210E−08 |

(c)

|  | Wide-angle end | Standard focal length | Telephoto end |
|---|---|---|---|
| f | 6.510 | 25.035 | 61.623 |
| Fno | 3.63 | 3.81 | 3.61 |
| 2ω | 60.76 | 16.40 | 6.60 |
| D5 | 0.50 | 12.79 | 18.16 |
| D12 | 19.04 | 6.76 | 1.38 |
| D18 | 9.44 | 2.54 | 9.23 |
| D22 | 2.76 | 9.67 | 2.99 |

In the above Table 1(a), the column "Group" indicates the number "i" of lens group (i=1 to 4), the surface number indicates the number "j" of the (refracting) surface Sj, R is the radius of curvature of the refracting surface, Dj is the spacing of the refracting surface (thickness of the optical element on the optical axis or its gap length), ndj is the refractive index on the d line of the lens material of the part Dj, and vj is the Abbe's number of the part Dj. Further, a surface with an asterisk (*) in the surface number is an aspherical surface.

The above Table 1(b) gives the values of the coefficients K, $A_4$, $A_6$, $A_8$, $A_{10}$ in the above Equation (7) for the surfaces S7, S14, S15, S19, and S20.

Further, in the above Table 1(c), f[mm] is the focal length of the zoom lens, Fno is the F-number, and 2ω is the image angle. This table shows the values of the focal length f, the F-number, the image angle 2ω, and the lengths D5, D12, D18, and D22, when the state of the zoom lens changes from the wide-angle end to the standard focal length and to the telephoto end.

Further, the values of $f2/(fw*ft)^{1/2}$, $(\Sigma d+fb)/2YD$, $n_{2N}$, $v_{2P}$, and $v_{1P}$ for the zoom lens 1 in these examples are shown in Table 2 below.

TABLE 2

| Conditional equation | Example 1 | Example 2 | Example 3 |
|---|---|---|---|
| $f2/(fw*ft)^{1/2}$ | 0.32 | 0.32 | 0.34 |
| $(\Sigma d + fb)/2YD$ | 7.96 | 7.74 | 8.10 |
| $\Sigma D/2YD$ | 3.27 | 3.18 | 3.26 |
| $n_{2N}$ | 1.883 | 1.883 | 1.883 |
| $v_{2P}$ | 23.7 | 23.7 | 23.7 |
| $v_{1P}$ | 81.6 | 81.6 | 81.6 |

As is shown in Table 2 above, each of the values of $f2/(fw*ft)^{1/2}$, $(\Sigma d+fb)/2YD$, $n_{2N}$, $v_{2P}$, and $v_{1P}$ for the zoom lens 1 in this example satisfy the above Equations (1)–(6), (2') and (3').

FIG. 5(*a*) is a figure showing the spherical aberration, astigmatic aberration, and distortion of the zoom lens 1 at the wide-angle end in this example. FIG. 5(*b*) is a figure showing the spherical aberration, astigmatic aberration, and distortion with the standard focal length condition of the zoom lens 1 in this example. FIG. 5(*c*) is a figure showing the spherical aberration, astigmatic aberration, and distortion of the zoom lens 1 at the telephoto end in this example. As shown in FIGS. 5(*a*), 5(*b*), and 5(*c*), according to the zoom lens 1 of this example, even when the state of the zoom lens is changed from the wide-angle end to the standard focal length to the telephoto end, it is possible to correct satisfactorily the spherical aberration, the astigmatic aberration, and the distortion.

EXAMPLE 2

A concrete second example related to the above second embodiment is described here. The zoom lens 2 in this example satisfies Table 3 below.

TABLE 3

(a)

| Group | Surface | R | Dj | ndj | vj |
|---|---|---|---|---|---|
| 1 | 1 | 34.481 | 1.10 | 1.84666 | 23.7 |
|   | 2 | 21.468 | 5.35 | 1.496999 | 81.6 |
|   | 3 | −7003.200 | 0.20 |   |   |
|   | 4 | 19.918 | 3.10 | 1.729157 | 54.6 |
|   | 5 | 60.316 | Variable |   |   |
| 2 | 6 | 45.407 | 0.80 | 1.882997 | 40.7 |
|   | 7* | 5.796 | 2.99 |   |   |
|   | 8 | −22.286 | 0.60 | 1.729157 | 54.6 |
|   | 9 | 13.371 | 0.29 |   |   |
|   | 10 | 9.987 | 2.00 | 1.846659 | 23.7 |
|   | 11 | −48.502 | 0.60 | 1.743997 | 44.7 |
|   | 12 | 32.000 | Variable |   |   |
| Opening aperture | 13 | 1.00E+18 | 0.60 |   |   |
| 3 | 14* | 7.092 | 2.00 | 1.583126 | 59.3 |
|   | 15* | −22.813 | 0.38 |   |   |
|   | 16 | 6.999 | 2.10 | 1.518229 | 58.9 |
|   | 17 | 45.168 | 0.60 | 1.805181 | 25.4 |
|   | 18 | 4.800 | Variable |   |   |
| 4 | 19* | 11.139 | 2.10 | 1.48749 | 70.2 |
|   | 20 | −297.420 | Variable |   |   |
|   | 21 | 1.00E+18 | 1.48 | 1.5488 | 66.9 |
|   | 22 | 1.00E+18 | 0.50 | 1.51633 | 64.1 |
|   | 23 | 1.00E+18 |   |   |   |

(b)

|   | Seventh surface T7 | Fourteenth surface T14 | Fifteenth surface T15 | Nineteenth surface T19 |
|---|---|---|---|---|
| K | 3.0947E−01 | −1.8927E−01 | −5.0000E+00 | −1.3853E+00 |
| $A_4$ | −1.1019E−04 | −4.4613E−05 | 3.3586E−04 | 1.5534E−04 |
| $A_6$ | −7.9492E−06 | 2.6885E−05 | 4.0939E−05 | −1.2813E−05 |
| $A_8$ | 2.5409E−07 | −1.5660E−06 | −3.0514E−06 | 1.2304E−06 |
| $A_{10}$ | −2.6992E−08 | 2.1970E−07 | 3.4682E−07 | −3.4539E−08 |

(c)

|   | Wide-angle end | Standard focal length | Telephoto end |
|---|---|---|---|
| f | 6.241 | 25.040 | 58.794 |
| Fno | 3.55 | 3.71 | 3.52 |
| 2ω | 62.80 | 16.26 | 6.90 |
| D5 | 0.50 | 12.66 | 17.47 |
| D12 | 18.27 | 6.12 | 1.30 |

TABLE 3-continued

| D18 | 9.12 | 2.29 | 8.77 |
| D22 | 2.77 | 9.57 | 3.12 |

The denoting methods in the above Table 3 is similar to those in Table 1 of the Example 1 described above.

Further, the values of $f2/(fw*ft)^{1/2}$, $(\Sigma d+fb)/2YD$, $n_{2N}$, $v_{2P}$, and $v_{1P}$ for the zoom lens 2 in this example are shown in Table 3 above. As is shown in Table 3 above, each of the values of $f2/(fw*ft)^{1/2}$, $(\Sigma d+fb)/2YD$, $n_{2N}$, $v_{2P}$, and $v_{1P}$ for the zoom lens 2 in this example satisfy the above Equations (1)–(6), (2') and (3').

FIG. 6(*a*) is a figure showing the spherical aberration, astigmatic aberration, and distortion of the zoom lens 2 at the wide-angle end in this implementation example. FIG. 6(*b*) is a figure showing the spherical aberration, astigmatic aberration, and distortion of the zoom lens 2 with standard focal length. FIG. 6(*c*) is a figure showing the spherical aberration, astigmatic aberration, and distortion of the zoom lens 2 at the telephoto end. As is shown in FIGS. 6(*a*), 6(*b*), and 6(*c*), according to the zoom lens 2 of this example, it is possible to correct satisfactorily the spherical aberration, the astigmatic aberration, and the distortion, even when the state of the zoom lens is changed from the wide-angle end to the standard focal length to the telephoto end.

EXAMPLE 3

A concrete third example related to the above third embodiment is described here. The zoom lens 3 in this example satisfies Table 4 below.

TABLE 4

(a)

| Group | Surface | R | Dj | ndj | vj |
|---|---|---|---|---|---|
| 1 | 1 | 37.919 | 1.10 | 1.84666 | 23.7 |
|   | 2 | 23.733 | 5.23 | 1.496999 | 81.6 |
|   | 3 | −867.970 | 0.20 |   |   |
|   | 4 | 21.574 | 3.10 | 1.729157 | 54.6 |
|   | 5 | 60.463 | Variable |   |   |
| 2 | 6 | 28.708 | 0.85 | 1.882997 | 40.7 |
|   | 7* | 6.220 | 3.28 |   |   |
|   | 8 | −21.714 | 0.60 | 1.729157 | 54.6 |
|   | 9 | 13.082 | 0.29 |   |   |
|   | 10 | 10.233 | 2.00 | 1.846659 | 23.7 |
|   | 11 | −113.260 | 0.30 |   |   |
|   | 12 | −63.673 | 0.60 | 1.743997 | 44.7 |
|   | 13 | 41.260 | Variable |   |   |
| Opening aperture | 14 | 1.00E+18 | 0.60 |   |   |
| 3 | 15* | 7.380 | 2.00 | 1.583126 | 59.3 |
|   | 16* | −25.162 | 0.38 |   |   |
|   | 17 | 7.000 | 2.10 | 1.518229 | 58.9 |
|   | 18 | 32.803 | 0.62 | 1.805181 | 25.4 |
|   | 19 | 4.884 | Variable |   |   |
| 4 | 20* | 11.743 | 2.10 | 1.48749 | 70.2 |
|   | 23 | −1024.100 | Variable |   |   |
|   | 24 | 1.00E+18 | 1.48 | 1.5488 | 66.9 |
|   | 25 | 1.00E+18 | 0.50 | 1.51633 | 64.1 |
|   | 26 | 1.00E+18 |   |   |   |

(b)

|   | Seventh surface U7 | Fifteenth surface U15 | Sixteenth surface U16 | Twentieth surface U20 |
|---|---|---|---|---|
| K | 3.7480E−01 | −1.5303E−01 | −4.7213E+00 | −2.2814E+00 |
| $A_4$ | −9.0415E−05 | −2.6570E−05 | 3.2122E−04 | 1.5302E−04 |
| $A_6$ | −8.6401E−06 | 2.6337E−05 | 3.8980E−05 | 3.9862E−06 |

TABLE 4-continued

| $A_8$ | 5.0595E−07 | −1.7678E−06 | −3.0594E−06 | −1.0565E−07 |
|---|---|---|---|---|
| $A_{10}$ | −2.3495E−08 | 2.3579E−07 | 3.5982E−07 | 2.4184E−09 |

(c)

| | Wide-angle end | Standard focal length | Telephoto end |
|---|---|---|---|
| f | 6.472 | 25.019 | 60.922 |
| Fno | 3.64 | 3.78 | 3.62 |
| 2ω | 60.76 | 16.26 | 6.66 |
| D5 | 0.50 | 13.61 | 19.16 |
| D12 | 19.96 | 6.85 | 1.30 |
| D18 | 9.45 | 8.49 | 9.11 |
| D22 | 2.75 | 9.73 | 3.10 |

The denoting methods in the above Table 4 is similar to those in Table 1 in Example 1 described above.

Further, the values of $f2/(fw*ft)^{1/2}$, $(\Sigma d+fb)/2YD$, $n_{2N}$, $v_{2P}$, and $v_{1P}$ for the zoom lens 3 in this example are shown in Table 4 above. As is shown in Table 4 above, each of the values of $f2/(fw*ft)^{1/2}$, $(\Sigma d+fb)/2YD$, $n_{2N}$, $v_{2P}$, and $v_{1P}$ for the zoom lens 2 in this example satisfy the above Equations (1)–(6), (2') and (3').

FIG. 7(a) is a figure showing the spherical aberration, astigmatic aberration, and distortion of the zoom lens 3 at the wide-angle end in this implementation example. FIG. 7(b) is a figure showing the spherical aberration, astigmatic aberration, and distortion of the zoom lens 3 in this implementation example with a standard focal length. FIG. 7(c) is a figure showing the spherical aberration, astigmatic aberration, and distortion of the zoom lens 3 at the telephoto end in this example. As is shown in FIGS. 7(a), 7(b), and 7(c), according to the zoom lens 3 of this example, it is possible to correct satisfactorily the spherical aberration, the astigmatic aberration, and the distortion even, when the state of the zoom lens is changed from the wide-angle end to the standard focal length to the telephoto end.

Hereinafter, each of above described embodiments and examples is a typical sample of the preferable zoom lens and an image pickup apparatus according to the present invention and does not restrict the scope of the present invention.

For example, in above each embodiment and Example 1, an example of the digital still camera, which is the image pickup apparatus in which the zoom lens is mounted, is described. However, it is not limited to this, but may also be made a device of potable terminals having at least the image pickup function such as the video camera, the mobile phone with the image pickup function, PHS (Personal Handyphone System), PDA (Personal Digital Assistan t).

Further, the image pickup apparatus in which the zoom lens is mounted may also be made an image pickup unit mounted in the above device. Herein, referring to FIG. 8, an example of the mobile phone 300 in which the image pickup unit 350 as the image pickup apparatus is mounted, will be described. FIG. 8 shows an internal configuration of the mobile telephone unit 300.

As shown in FIG. 8, the mobile phone 300 is provided with: a control section (CPU) 310 for collectively controlling the different sections and also executes the different program to carry out the different kinds of processing; an operation section 320 for making the operations of entering numbers or other inputs using keys; a display section 330 for displaying image picked-up images other than the predetermined data; a wireless communication section 340 for realizing various types of information communication between the phone and the external server through an antenna 341; an image pickup unit 350 as the image pickup apparatus; a storage section (ROM) 360 for storing many necessary data such as the system program of the mobile phone unit 300, each kind of processing program, and terminal IDs; and a temporary storage section (RAM) 370 which is used as the working area for temporarily storing each kind of processing program, data or processing data, carried out by the control section 310, or the image pickup data by the image pickup unit 350.

The image pickup unit 350 is provided with the zoom lens 1, 2, or 3 according to the above first embodiment or the modified embodiments, a (solid state) image pickup device, a lens barrel, and a drive mechanism for the zoom lens 1, 2, or 3. The image pickup unit 350 itself does not have a control section or an image processing section but is a lens unit that is presumed to be connected via a connector etc., with the control section, operation section, and the display section. In specific terms, the image pickup unit 350, is, for example, installed at a position corresponding to below the main display section, and the object side end surface of the body in the image pickup optical system is installed in the back panel of the mobile telephone unit 300 (the main display section of the display section 330 is taken as the front panel). Further, the external connection terminals of the image pickup unit 350 are connected to the control section 310 of the mobile telephone unit 300, and the video signal comprising the luminance signal and the color difference signal photographed by the image pickup unit 350 is output to the side of the control section 310 via the external connection terminals. In addition, the video signal input from the image pickup unit 350 is either stored in the storage section 360 by the control system of the mobile telephone unit 300 or is displayed in the display section 330, or is transmitted to an external equipment as video information via the wireless communication section 340.

In addition, the image pickup unit as the image pickup apparatus in which the zoom lens is mounted, may also be structured as a camera module which is assumed that it has the lens unit and the control section and the image processing section arranged on the substrate, and is used by being connected to the separated body having the display section and the operation section by the connector.

What is claimed is:

1. A zoom lens comprising:
   a first lens group with a positive refractive power;
   a second lens group with a negative refractive power;
   a third lens group with a positive refractive power;
   a fourth lens group with a positive refractive power,
   wherein the first to fourth lens groups are arranged in this order from an object side of the zoom lens,
   the first lens group and the third lens group are positioned statically,
   the second lens group is moved to be close to an image surface side of the zoom lens for zooming the zoom lens,
   the fourth lens group is moved for correcting a focus movement caused by zooming the zoom lens and is further moved for focusing the zoom lens,
   the second lens group consists of: a negative lens in a meniscus shape whose concave surface faces the image surface side of the zoom lens; a negative lens; a positive lens; and a negative lens, and
   the negative lens in a meniscus shape, the negative lens, the positive lens, and the negative lens in the second lens group are arranged in this order from an objective side of the zoom lens.

2. The zoom lens of claim 1,
wherein the zoom lens satisfies following expressions:

$$0.23 \leq |f2|/\sqrt{fw \times ft} \leq 0.40$$

$$7 \leq (\Sigma d + fb)/2YD \leq 10,$$

where f2 is a focal length of the second lens group,
fw is a focal length of a total system of the zoom lens at a wide-angle end,
ft is a focal length of the total system of the zoom lens at a telephoto end,
$\Sigma d + fb$ is a distance along an optical axis from a lens surface of the zoom lens arranged closest to an object in the total system of the zoom lens to an image side focal point, and
2YD is $2 \times fw \times \tan \omega w$,
where fw is a focal length of the total system of the zoom lens in a wide-angle end, and
$\omega w$ is a maximum field angle at the wide-angle end.

3. The zoom lens of claim 2,
wherein the second lens group comprises one aspherical surface.

4. The zoom lens of claim 2,
wherein at least one negative lens in the second lens group satisfies $n_{2N} \geq 1.8$,
where $n_{2N}$ is a refractive index of the negative lens in the second lens group for d-line.

5. The zoom lens of claim 2,
wherein the positive lens in the second lens group satisfies $v_{2P} \geq 30$,
where $v_{2P}$ is an Abbe's number of the positive lens in the second lens group.

6. The zoom lens of claim 2,
wherein the first lens group consists of:
a negative lens; and
a positive lens satisfying $v_{1P} \geq 70$,
where $v_{1P}$ is an Abbe's number of the positive lens in the first lens group.

7. The zoom lens of claim 2,
wherein a third lens and a fourth lens arranged in the second lens group from the object side are cemented each other.

8. An image pickup apparatus comprising:
the zoom lens of claim 2; and
an image pickup element for picking-up a light flux entering into the image pickup element through the zoom lens.

9. The zoom lens of claim 1,
wherein the first lens group consists of: a negative lens; a positive lens; and a positive lens,
the negative lens, the positive lens and the positive lens of the first lens group are arranged in this order from the object side of the zoom lens,
the third lens group consists of a positive lens, a positive lens and a negative lens whose surface having larger curvature faces the image side of the zoom lens,
the positive lens, the positive lens and the negative lens whose surface having larger curvature faces the image side of the zoom lens of the third lens group are arranged in this order from the object side of the zoom lens,
the forth lens group consists of two or less lenses,
the zoom lens satisfies a following expression:

$$2.5 \leq \Sigma D + 2YD \leq 5.0,$$

where $\Sigma D$ is a sum of thickness of each lens group in the zoom lens,
2YD is $2 \times fw \times \tan \omega w$,
where fw is a focal length of a total system of the zoom lens in a wide-angle end, and
$\omega w$ is a maximum field angle at the wide-angle end.

10. The zoom lens of claim 9,
wherein the third lens group comprises one aspherical surface.

11. The zoom lens of claim 9,
wherein the fourth lens group comprises one aspherical surface.

12. The zoom lens of claim 9,
wherein the second lens group comprises one aspherical surface.

13. The zoom lens of claim 9,
wherein at least one negative lens in the second lens group satisfies $n_{2N} \geq 1.8$,
where $n_{2N}$ is a refractive index of the negative lens in the second lens group for d-line.

14. The zoom lens of claim 9,
wherein the positive lens in the second lens group satisfies $v_{2P} \leq 30$,
where $v_{2P}$ is an Abbe's number of the positive lens in the second lens group.

15. The zoom lens of claim 9,
wherein the first lens group consists of:
a negative lens; and
a positive lens satisfying $v_{1P} \geq 70$,
where $v_{1P}$ is an Abbe's number of the positive lens in the first lens group.

16. The zoom lens of claim 9,
wherein a third lens and a fourth lens arranged in the second lens group from the object side are cemented each other.

17. An image pickup apparatus comprising:
the zoom lens of claim 9; and
an image pickup element for picking-up a light flux entering into the image pickup element through the zoom lens.

\* \* \* \* \*